US011958673B2

(12) United States Patent
Thompson et al.

(10) Patent No.: US 11,958,673 B2
(45) **Date of Patent: *Apr. 16, 2024**

(54) CARRIER FOR CONTAINERS

(71) Applicant: Graphic Packaging International, LLC, Atlanta, GA (US)

(72) Inventors: Jon Thompson, Bristol (GB); Colin P. Ford, Woodstock, GA (US)

(73) Assignee: Graphic Packaging International, LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/864,664

(22) Filed: Jul. 14, 2022

(65) Prior Publication Data

US 2023/0019145 A1 Jan. 19, 2023

Related U.S. Application Data

(60) Provisional application No. 63/260,881, filed on Sep. 3, 2021, provisional application No. 63/222,225, filed on Jul. 15, 2021.

(51) Int. Cl.
*B65D 71/42* (2006.01)
*B31B 50/73* (2017.01)
(Continued)

(52) U.S. Cl.
CPC ............ *B65D 71/42* (2013.01); *B31B 50/732* (2017.08); *B31B 50/86* (2017.08); *B65D 71/44* (2013.01);
(Continued)

(58) Field of Classification Search
CPC ... B31B 50/86; B31B 50/732; B31B 2105/00; B31B 2241/001; B65D 71/42;
(Continued)

(56) References Cited

U.S. PATENT DOCUMENTS 1,527,399 A 2/1925 Davidson
2,289,859 A 7/1942 Arthur
(Continued)

FOREIGN PATENT DOCUMENTS

AT 399701 B 7/1995
CA 2133827 10/1993
(Continued)

OTHER PUBLICATIONS

International Search Report and Written Opinion for PCT/US2022/037071 dated Nov. 2, 2022.
(Continued)

*Primary Examiner* — Bryon P Gehman
(74) *Attorney, Agent, or Firm* — Womble Bond Dickinson (US) LLP

(57) ABSTRACT

A carrier for holding a plurality of containers includes a plurality of panels forming a front portion, a back portion, and a central portion extending from the front portion to the back portion, the front portion having a front attachment panel for at least partially receiving a respective container of the plurality of containers, the back portion having a back attachment panel for at least partially receiving a respective container of the plurality of containers, the central portion having a central panel, and locking features for maintaining an erected configuration of the carrier, the locking features including at least one male locking feature extending from a respective panel of the plurality of panels and being at least partially received in a respective at least one female locking feature at least partially defined in a respective panel of the plurality of panels.

68 Claims, 6 Drawing Sheets

(51) Int. Cl.
*B31B 50/86* (2017.01)
*B65D 71/44* (2006.01)
*B31B 105/00* (2017.01)

(52) U.S. Cl.
CPC ..... *B31B 2105/00* (2017.08); *B31B 2241/001* (2013.01); *B65D 2571/00141* (2013.01); *B65D 2571/0016* (2013.01); *B65D 2571/00296* (2013.01); *B65D 2571/00444* (2013.01); *B65D 2571/0066* (2013.01)

(58) Field of Classification Search
CPC .......... B65D 71/44; B65D 2571/00141; B65D 2571/0016; B65D 2571/00296; B65D 2571/00444; B65D 2571/0066
USPC .................................................. 206/427, 434
See application file for complete search history.

(56) References Cited

U.S. PATENT DOCUMENTS 2,320,440 A 6/1943 Kruea
2,331,038 A 10/1943 Meller
2,397,376 A 3/1946 Caldwell
2,397,716 A 4/1946 Wendler
2,522,950 A 9/1950 Keith
2,594,376 A 4/1952 Arneson
2,594,377 A 4/1952 Arneson
2,737,326 A 3/1956 Toensmeier
2,798,603 A 7/1957 Grinspoon
2,814,385 A 11/1957 Stone
2,950,041 A 8/1960 Stone
2,965,410 A 12/1960 Hughes
3,001,647 A 9/1961 Liss
3,005,654 A 10/1961 Stone et al.
3,046,711 A 7/1962 Harrison
3,061,141 A 10/1962 Cote
3,094,210 A 6/1963 Van Der Berg
3,099,475 A 7/1963 Manizza
3,118,537 A 1/1964 Copping
3,128,034 A 4/1964 Weiss
3,137,109 A 6/1964 Rapata
3,146,885 A 9/1964 Grantham
3,156,358 A 11/1964 Randrup
3,200,944 A 8/1965 Rapata
3,223,308 A 12/1965 Weiss
3,245,711 A 4/1966 Dantoin
3,257,066 A 6/1966 Williams
3,281,180 A 10/1966 Spery
3,302,784 A 2/1967 Copping
3,387,879 A 6/1968 Wood
3,404,912 A 10/1968 Watts
3,410,596 A 11/1968 Slevin, Jr.
3,432,202 A 3/1969 Ebelhardt
3,463,535 A 8/1969 Beart
3,528,697 A 9/1970 Wood
3,587,847 A 6/1971 Graser
3,601,439 A 8/1971 Poupitch
3,612,266 A 10/1971 Graser
D222,579 S 11/1971 Oglesbee
3,627,121 A 12/1971 Deasy
3,653,503 A 4/1972 Arneson
3,693,787 A 9/1972 Duerr
3,698,550 A 10/1972 Graser
3,701,416 A 10/1972 Lawrence
3,722,945 A 3/1973 Wood
3,726,558 A 4/1973 Klygis
3,734,278 A 5/1973 Kerrigan
3,767,041 A 10/1973 Graser
3,876,066 A 4/1975 Klygis
3,897,873 A 8/1975 Graser
3,924,739 A 12/1975 Gravesteijn
3,942,631 A 3/1976 Sutherland et al.
4,029,204 A 6/1977 Manizza
4,111,298 A 9/1978 Mascia
4,120,396 A 10/1978 Mascia
4,136,772 A 1/1979 Mascia
4,155,502 A 5/1979 Forte
4,190,149 A 2/1980 Oliff et al.
4,192,540 A 3/1980 Oliff
D257,001 S 9/1980 Oliff
4,244,617 A 1/1981 Manizza
4,304,329 A 12/1981 Graser
D265,292 S 7/1982 Killy
4,339,032 A 7/1982 Wood
D265,979 S 8/1982 Arfert
4,372,599 A 2/1983 Kiedaisch et al.
4,378,879 A 4/1983 Killy
4,382,505 A 5/1983 Sutherland et al.
4,441,611 A 4/1984 Sommariva
4,453,630 A 6/1984 Helms
4,471,870 A 9/1984 Uhlig
4,523,676 A 6/1985 Barrash
4,566,591 A 1/1986 Turtschan
4,703,847 A 11/1987 Oliff
D294,331 S 2/1988 Panazzolo
4,736,977 A 4/1988 Killy
4,784,266 A 11/1988 Chaussadas
D304,017 S 10/1989 Oliff
4,911,288 A 3/1990 Dantoin, Jr.
4,974,726 A 12/1990 Klygis et al.
5,002,225 A 3/1991 Bienaime
5,065,862 A 11/1991 Mousseau
5,103,971 A 4/1992 Schuster
5,125,506 A 6/1992 Galbierz et al.
5,135,104 A 8/1992 Jorba
5,139,147 A 8/1992 Sutherland
D329,807 S 9/1992 Heider
5,188,225 A 2/1993 Jorba
5,193,673 A 3/1993 Rathbone et al.
5,201,412 A 4/1993 Schuster et al.
5,230,425 A 7/1993 Edqvist et al.
5,246,113 A 9/1993 Schuster
5,263,299 A 11/1993 Galbierz et al.
5,267,644 A 12/1993 Tsao
5,282,348 A 2/1994 Dampier et al.
5,297,673 A 3/1994 Sutherland
5,310,050 A 5/1994 Sutherland
5,310,051 A 5/1994 Sutherland
5,314,224 A 5/1994 Bates
5,318,178 A 6/1994 Davies et al.
5,323,895 A 6/1994 Sutherland et al.
5,328,024 A 7/1994 Sutherland
5,335,774 A 8/1994 Ganz
5,351,815 A 10/1994 Fogle et al.
5,351,816 A 10/1994 Sutherland et al.
5,351,817 A 10/1994 Sutherland
5,355,999 A 10/1994 Sutherland
5,360,104 A 11/1994 Sutherland
5,390,784 A 2/1995 Sutherland
5,407,065 A 4/1995 Sutherland
5,415,278 A 5/1995 Sutherland
5,425,446 A 6/1995 Weaver
5,443,153 A 8/1995 Sutherland
5,445,262 A 8/1995 Sutherland
5,452,799 A 9/1995 Sutherland
5,484,053 A 1/1996 Harris
5,485,914 A 1/1996 Martin
5,487,464 A 1/1996 Galbierz et al.
5,490,593 A 2/1996 Gordon et al.
5,503,267 A 4/1996 Sutherland
5,520,283 A 5/1996 Sutherland
5,524,756 A 6/1996 Sutherland
5,542,536 A * 8/1996 Sutherland ............. B65D 71/36 206/427
5,551,566 A 9/1996 Sutherland
5,553,704 A 9/1996 Gordon et al.
5,553,705 A 9/1996 Bakx
5,573,111 A 11/1996 Gordon
5,590,776 A 1/1997 Galbierz
5,593,027 A 1/1997 Sutherland
5,609,247 A 3/1997 Appleton
5,609,251 A 3/1997 Harris
5,609,379 A 3/1997 Harrelson

(56) References Cited

U.S. PATENT DOCUMENTS

| | | | |
|---|---|---|---|
| 5,639,137 A | 6/1997 | Bakx | |
| 5,682,982 A | 11/1997 | Stonehouse | |
| 5,706,936 A | 1/1998 | Bernstein | |
| 5,711,419 A | 1/1998 | Beales et al. | |
| 5,735,394 A | 4/1998 | Harrelson | |
| 5,746,310 A | 5/1998 | Slomski | |
| 5,762,193 A | 6/1998 | Marco | |
| 5,791,463 A | 8/1998 | Negelen | |
| 5,816,391 A | 10/1998 | Harris | |
| 5,845,776 A | 12/1998 | Galbierz et al. | |
| 5,878,876 A | 3/1999 | Galbierz et al. | |
| 5,960,945 A | 10/1999 | Sutherland | |
| 6,039,181 A | 3/2000 | Whiteside | |
| 6,059,099 A | 5/2000 | Galbierz | |
| 6,082,532 A | 7/2000 | Miess | |
| 6,145,656 A | 11/2000 | Marco | |
| 6,293,392 B1 | 9/2001 | Galbierz | |
| 6,315,111 B1 | 11/2001 | Sutherland | |
| 6,394,272 B1 | 5/2002 | Domansky | |
| 6,896,130 B2 | 5/2005 | Theelen | |
| D506,925 S | 7/2005 | Plumer | |
| 7,011,209 B2 | 3/2006 | Sutherland et al. | |
| 7,048,113 B2 * | 5/2006 | Gomes | B65D 71/16 206/434 |
| 7,360,647 B2 | 4/2008 | Ogg | |
| 7,690,507 B2 | 4/2010 | Sutherland | |
| 7,721,878 B2 | 5/2010 | Requena | |
| 7,762,397 B2 | 7/2010 | Coltri-Johnson et al. | |
| 7,789,231 B2 | 9/2010 | Requena | |
| 7,823,721 B2 | 11/2010 | Sutherland et al. | |
| 7,913,844 B2 * | 3/2011 | Spivey, Sr. | B65D 71/16 206/427 |
| 8,056,709 B2 | 11/2011 | Sutherland | |
| 8,096,413 B2 | 1/2012 | Coltri DePaula | |
| 8,162,135 B2 | 4/2012 | Oliveira | |
| 8,353,398 B2 | 1/2013 | DePaula et al. | |
| 8,387,784 B2 | 3/2013 | Gonzalez et al. | |
| 8,443,968 B2 | 5/2013 | DePaula | |
| 8,464,866 B2 | 6/2013 | Sutherland et al. | |
| 8,469,184 B2 | 6/2013 | Spivey, Sr. | |
| 8,602,209 B2 | 12/2013 | Jones et al. | |
| 8,631,932 B2 | 1/2014 | Holley, Jr. | |
| 8,701,878 B2 | 4/2014 | Spivey, Sr. | |
| 8,925,720 B2 | 1/2015 | Sutherland et al. | |
| 8,936,149 B2 | 1/2015 | Smalley | |
| 8,955,674 B2 | 2/2015 | Spivey, Sr. et al. | |
| 9,079,699 B2 | 7/2015 | Holley, Jr. | |
| 9,169,050 B2 | 10/2015 | Spivey, Sr. | |
| 9,284,090 B2 | 3/2016 | Lettre | |
| 9,359,093 B2 | 6/2016 | DePaula et al. | |
| 9,376,250 B2 | 6/2016 | Spivey, Sr. | |
| D767,408 S | 9/2016 | Shuster | |
| 9,446,891 B2 | 9/2016 | Jones et al. | |
| 9,511,916 B2 | 12/2016 | Holley, Jr. | |
| 9,669,976 B2 | 6/2017 | Kastanek et al. | |
| 9,676,535 B2 | 6/2017 | Spivey, Sr. | |
| 10,077,131 B2 | 9/2018 | Lettre | |
| D881,021 S | 4/2020 | Bandinu | |
| D881,718 S | 4/2020 | Bandinu | |
| 10,836,550 B2 | 11/2020 | Zacherle | |
| D918,057 S | 5/2021 | L'Heureux | |
| D918,058 S | 5/2021 | L'Heureux | |
| 11,014,727 B2 | 5/2021 | McCree | |
| D920,809 S | 6/2021 | Chesnet et al. | |
| D921,493 S | 6/2021 | Chesnet | |
| D923,416 S | 6/2021 | Luciano | |
| 11,027,904 B2 | 6/2021 | McCree | |
| 11,027,905 B2 | 6/2021 | Ford | |
| 11,180,301 B2 | 11/2021 | Smalley | |
| D944,656 S | 3/2022 | Spivey, Sr. | |
| D946,416 S | 3/2022 | Smalley | |
| D946,417 S | 3/2022 | Gonzalez Manzano | |
| D946,418 S | 3/2022 | Gonzalez Manzano | |
| D946,419 S | 3/2022 | Gonzalez Manzano | |
| D946,420 S | 3/2022 | Gonzalez Manzano | |
| D946,421 S | 3/2022 | Gonzalez Manzano | |
| 11,261,013 B2 | 3/2022 | Smalley | |
| 11,286,094 B2 | 3/2022 | Gonzalez Manzano | |
| D955,889 S | 6/2022 | Gonzalez Manzano | |
| D955,890 S | 6/2022 | Gonzalez Manzano | |
| D956,574 S | 7/2022 | Gonzalez Manzano | |
| 11,401,094 B2 | 8/2022 | McCree | |
| 11,401,095 B2 | 8/2022 | Rosenbrien | |
| 11,420,802 B2 | 8/2022 | Kooc | |
| D962,789 S | 9/2022 | Noel | |
| 11,628,994 B2 | 4/2023 | McCree | |
| 2002/0195371 A1 | 12/2002 | Brown | |
| 2003/0080004 A1 | 5/2003 | Olsen et al. | |
| 2003/0213705 A1 | 11/2003 | Woog | |
| 2004/0206639 A1 | 10/2004 | Karlsson | |
| 2004/0211695 A1 | 10/2004 | Karlsson | |
| 2004/0226833 A1 | 11/2004 | Daniel | |
| 2005/0127151 A1 | 6/2005 | Johnson | |
| 2005/0199513 A1 | 9/2005 | Bakx et al. | |
| 2006/0255114 A1 | 11/2006 | Hand et al. | |
| 2007/0080084 A1 | 4/2007 | Sutherland | |
| 2007/0163908 A1 | 7/2007 | Sutherland | |
| 2008/0257763 A1 | 10/2008 | Ogg | |
| 2009/0101526 A1 | 4/2009 | Sutherland et al. | |
| 2009/0127147 A1 | 5/2009 | Sutherland | |
| 2010/0078337 A1 | 4/2010 | Sutherland et al. | |
| 2010/0264043 A1 | 10/2010 | DePaula | |
| 2011/0000799 A1 | 1/2011 | Gonzalez | |
| 2012/0080328 A1 | 4/2012 | DePaula | |
| 2012/0138489 A1 | 6/2012 | Holley, Jr. | |
| 2015/0191287 A1 | 7/2015 | L'Heureux et al. | |
| 2016/0325899 A1 | 11/2016 | L'Heureux et al. | |
| 2018/0111734 A1 | 4/2018 | Jego | |
| 2018/0222650 A1 | 8/2018 | Zacherle | |
| 2018/0362234 A1 | 12/2018 | L'Heureux et al. | |
| 2019/0119019 A1 | 4/2019 | Patton | |
| 2020/0010255 A1 | 1/2020 | Zacherle et al. | |
| 2020/0079564 A1 | 3/2020 | Ford | |
| 2020/0189817 A1 | 6/2020 | Smalley | |
| 2020/0189818 A1 | 6/2020 | McCree | |
| 2020/0189819 A1 | 6/2020 | McCree | |
| 2020/0189821 A1 | 6/2020 | Smalley | |
| 2020/0189822 A1 | 6/2020 | Smalley | |
| 2020/0223612 A1 | 7/2020 | Swenson | |
| 2021/0061502 A1 | 3/2021 | Johnston | |
| 2021/0094742 A1 | 4/2021 | Gonzalez Manzano | |
| 2021/0276776 A1 | 9/2021 | Zammit | |
| 2021/0316921 A1 | 10/2021 | Holtz | |
| 2021/0331847 A1 | 10/2021 | Gonzalez Manzano | |
| 2021/0331848 A1 | 10/2021 | Gonzalez Manzano | |
| 2021/0339928 A1 | 11/2021 | Blin | |
| 2022/0009685 A1 | 1/2022 | Thompson | |
| 2022/0097941 A1 | 3/2022 | McCree | |

FOREIGN PATENT DOCUMENTS

| | | | |
|---|---|---|---|
| DE | 298 13 672 | U1 | 11/1998 |
| DE | 203 19 247 | U1 | 5/2004 |
| DE | 10 2009 059 047 | A1 | 6/2011 |
| EP | 0 051 413 | A1 | 5/1982 |
| EP | 0 060 504 | A2 | 9/1982 |
| EP | 0 057 437 | B1 | 5/1985 |
| EP | 0 496 807 | | 6/1993 |
| EP | 0 636 096 | | 2/1995 |
| EP | 0 715 593 | A1 | 6/1996 |
| EP | 0 398 835 | B1 | 10/1996 |
| EP | 1340691 | A1 | 9/2003 |
| EP | 1 401 727 | B1 | 6/2006 |
| EP | 1 910 187 | B1 | 3/2009 |
| EP | 2 067 713 | A1 | 6/2009 |
| EP | 1 528 007 | B1 | 10/2010 |
| EP | 2739547 | B1 | 7/2017 |
| EP | 3 666 684 | A1 | 6/2020 |
| EP | 3 666 685 | A1 | 6/2020 |
| FR | 2 737 196 | A1 | 1/1997 |
| GB | 1 256 684 | | 12/1971 |
| GB | 2 221 666 | A | 2/1990 |
| GB | 2 321 229 | A | 7/1998 |
| GB | 9006736716 | | 8/2019 |

(56) References Cited

FOREIGN PATENT DOCUMENTS

| | | | |
|---|---|---|---|
| GB | 2591535 | A | 8/2021 |
| GB | 6161591 | | 9/2021 |
| JP | 37-15730 | | 9/1960 |
| JP | 10-194330 | A | 7/1998 |
| JP | 10-297668 | A | 11/1998 |
| JP | 11-193059 | A | 7/1999 |
| JP | 2001-519300 | A | 10/2001 |
| JP | 2003-146359 | | 5/2003 |
| JP | 2004-189243 | A | 7/2004 |
| JP | 2015-048088 | A | 3/2015 |
| JP | 2016-124605 | | 7/2016 |
| KR | 10-2005-0051616 | A | 6/2005 |
| KR | 10-2020-0106806 | A | 9/2020 |
| KR | 301130233 | | 10/2021 |
| WO | WO 91/05716 | A1 | 5/1991 |
| WO | WO 93/02941 | | 2/1993 |
| WO | WO 93/02941 | A1 | 2/1993 |
| WO | WO 93/21083 | | 10/1993 |
| WO | WO 93/25439 | A1 | 12/1993 |
| WO | WO 94/22738 | A1 | 10/1994 |
| WO | WO 95/01289 | A1 | 1/1995 |
| WO | WO 95/06604 | | 3/1995 |
| WO | WO 95/10459 | A1 | 4/1995 |
| WO | WO 95/22495 | A1 | 8/1995 |
| WO | WO 96/26128 | A1 | 8/1996 |
| WO | WO 96/32340 | A1 | 10/1996 |
| WO | WO 03/016167 | A1 | 2/2003 |
| WO | WO 2006/044583 | A2 | 4/2006 |
| WO | WO 2008/058294 | A1 | 5/2008 |
| WO | WO 2010/006629 | A1 | 1/2010 |
| WO | WO 2010/101852 | A1 | 9/2010 |
| WO | WO 2016/100010 | A1 | 6/2016 |
| WO | WO 2016/112145 | A1 | 7/2016 |
| WO | WO 2020/210562 | A1 | 10/2020 |
| WO | WO 2021/038516 | A1 | 3/2021 |
| WO | WO 2021/168417 | A1 | 8/2021 |
| WO | WO 2021/188751 | A1 | 9/2021 |
| WO | WO 2021/262858 | A1 | 12/2021 |

OTHER PUBLICATIONS

"Florida brewery unveils six-pack rings that spare sea turtles, not snare them," by Thomas Leavy, CBSNews.com. Date posted: May 24, 2018. Site visited: Sep. 12, 2022. Available online: https://www.cbsnews.com/news/ florida-saltwater-brewery-non-plastic-six-pack-rings-spare-sea-turtles/ (Year: 2018).

"Pepsi trials molded pulp alternative to plastic rings" in BeverageDaily.com. Date posted: Feb. 28, 2020. Site visited: Sep. 12, 2022. Available online: https://www.beveragedaily.com/Article/2020/02/28/Pepsi-trials-molded-pulp-alternative-to-plastic-rings# (Year: 2020).

Enviroclip. Date posted: 2022. Site visited: Sep. 12, 2022. Available online: https://www.graphicpkg.com/products/enviroclip/ (Year: 2022).

"Paperboard Can Handle Applicator," as seen in Packaging World Online. Date first available: 2020. Site visited: Sep. 13, 2022. Available online: https://www.packworld.com/news/sustainability/article/21202650/paperboard-can-handle-applicator (Year: 2020).

"The 'Ecogrip' Corrugated Bottle Carrier is a Plastic Alternative" in Trendhunter.com. Date published: Jan. 20, 2021. Site visited: Sep. 12, 2022. Available online: https://www.trendhunter.com/trends/corrugated-bottle-carrier (Year: 2021).

Cap-it packaging video on Vimeo. Date posted: 2021. Site visited: Sep. 19, 2022. Available online: https://vimeo.com/610619455?embedded=true&source=vimeo_logo&owner=24551687 (Year: 2021).

2020 Package of the Year and Innovation of the Year on YouTube. Date posted: Oct. 19, 2020. Site visited: Sep. 12, 2022. Available online: https://www.youtube.com/watch?v=wxwpM4hodFA (Year: 2020).

International Search Report and Written Opinion for PCT/US2022/032608 dated Sep. 28, 2022.

International Search Report and Written Opinion for PCT/US2022/035207 dated Oct. 14, 2022.

International Search Report and Written Opinion for PCT/US2022/034840 dated Oct. 21, 2022.

International Search Report and Written Opinion for PCT/US2022/036297 dated Oct. 21, 2022.

International Search Report and Written Opinion for PCT/US2022/038638 dated Nov. 8, 2022.

International Search Report and Written Opinion for PCT/US2022/037069 dated Oct. 28, 2022.

U.S. Appl. No. 17/835,127, filed Jun. 8, 2022.

U.S. Appl. No. 29/838,182, filed May 11, 2022.

U.S. Appl. No. 17/851,200, filed Jun. 8, 2022.

U.S. Appl. No. 17/848,682, filed Jun. 24, 2022.

U.S. Appl. No. 29/838,178, filed May 11, 2022.

U.S. Appl. No. 29/838,181, filed May 11, 2022.

U.S. Appl. No. 17/859,178, filed Jul. 7, 2022.

U.S. Appl. No. 29/838,184, filed May 11, 2022.

U.S. Appl. No. 29/838,186, filed May 11, 2022.

U.S. Appl. No. 17/864,590, filed Jul. 14, 2022.

U.S. Appl. No. 17/875,755, filed Jul. 28, 2022.

U.S. Appl. No. 29/838,187, filed May 11, 2022.

U.S. Appl. No. 29/838,188, filed May 11, 2022.

* cited by examiner

CARRIER FOR CONTAINERS

CROSS-REFERENCE TO RELATED APPLICATIONS

This application claims the benefit of each of U.S. Provisional Patent Application No. 63/222,225, filed on Jul. 15, 2021, and U.S. Provisional Patent Application No. 63/260,881, filed on Sep. 3, 2021.

INCORPORATION BY REFERENCE

The disclosures of each of U.S. Provisional Patent Application No. 63/222,225, filed on Jul. 15, 2021, U.S. Provisional Patent Application No. 63/260,881, filed on Sep. 3, 2021, and U.S. Design patent application Ser. No. 29/838,186, filed on May 11, 2022, are hereby incorporated by reference for all purposes as if presented herein in their entirety.

BACKGROUND OF THE DISCLOSURE

The present disclosure generally relates to cartons or carriers for holding, displaying, and/or transporting containers.

SUMMARY OF THE DISCLOSURE

According to one aspect, the disclosure is generally directed to a carrier for holding a plurality of containers, the carrier comprising a plurality of panels forming a front portion, a back portion, and a central portion extending from the front portion to the back portion, the front portion comprising a front attachment panel for at least partially receiving a respective container of the plurality of containers, the back portion comprising a back attachment panel for at least partially receiving a respective container of the plurality of containers, the central portion comprising a central panel, and locking features for maintaining an erected configuration of the carrier, the locking features comprising at least one male locking feature extending from a respective panel of the plurality of panels and being at least partially received in a respective at least one female locking feature at least partially defined in a respective panel of the plurality of panels.

According to another aspect, the disclosure is generally directed to a blank for forming a carrier for holding a plurality of containers, the blank comprising a plurality of panels forming a front portion, a back portion, and a central portion extending from the front portion to the back portion, the front portion comprising a front attachment panel for at least partially receiving a respective container of the plurality of containers, the back portion comprising a back attachment panel for at least partially receiving a respective container of the plurality of containers, the central portion comprising a central panel, and locking features for maintaining an erected configuration of the carrier formed from the blank, the locking features comprising at least one male locking feature extending from a respective panel of the plurality of panels and for being at least partially received in a respective at least one female locking feature at least partially defined in a respective panel of the plurality of panels when the carrier is formed from the blank.

According to another aspect, the disclosure is generally directed to a method of forming a carrier for holding a plurality of containers, the method comprising obtaining a blank comprising a plurality of panels comprising a front attachment panel, a central panel, and a back attachment panel, the blank comprising locking features comprising at least one male locking feature extending from a respective panel of the plurality of panels and at least one female locking feature at least partially defined in a respective panel of the plurality of panels. The method further comprises arranging the plurality of panels to form a front portion of the carrier comprising the front attachment panel, arranging the plurality of panels to form a back portion of the carrier comprising the back attachment panel, arranging the plurality of panels to form a central portion of the carrier comprising the central panel and extending from the front portion of the carrier to the back portion of the carrier, and at least partially inserting the at least one male locking feature through the at least one female locking feature to maintain an erected configuration of the carrier.

According to another aspect, the disclosure is generally directed to a package, the package comprising a plurality of containers and a carrier holding the plurality of containers. The carrier comprises a plurality of panels forming a front portion, a back portion, and a central portion extending from the front portion to the back portion, the front portion comprising a front attachment panel at least partially receiving a respective container of the plurality of containers, the back portion comprising a back attachment panel at least partially receiving a respective container of the plurality of containers, the central portion comprising a central panel, and locking features maintaining an erected configuration of the carrier, the locking features comprising at least one male locking feature extending from a respective panel of the plurality of panels and being at least partially received in a respective at least one female locking feature at least partially defined in a respective panel of the plurality of panels.

Those skilled in the art will appreciate the above stated advantages and other advantages and benefits of various additional embodiments reading the following detailed description of the embodiments with reference to the below-listed drawing figures. It is within the scope of the present disclosure that the above-discussed aspects be provided both individually and in various combinations.

BRIEF DESCRIPTION OF THE DRAWINGS

According to common practice, the various features of the drawings discussed below are not necessarily drawn to scale. Dimensions of various features and elements in the drawings may be expanded or reduced to more clearly illustrate the embodiments of the disclosure.

Corresponding parts are designated by corresponding reference numbers throughout the drawings.

DETAILED DESCRIPTION OF THE EXEMPLARY EMBODIMENTS

The present disclosure generally relates to carriers, packages, constructs, sleeves, cartons, or the like, for holding and displaying containers such as jars, bottles, cans, etc. The containers can be used for packaging food and beverage products, for example. The containers can be made from materials suitable in composition for packaging the particular food or beverage item, and the materials include, but are not limited to, glass; plastics such as PET, LDPE, LLDPE, HDPE, PP, PS, PVC, EVOH, and Nylon; and the like; aluminum and/or other metals; or any combination thereof.

Carriers according to the present disclosure can accommodate containers of numerous different shapes. For the purpose of illustration and not for the purpose of limiting the scope of the disclosure, the following detailed description describes beverage containers (e.g., aluminum cans) at least partially disposed within the carrier embodiments. In this specification, the terms "lower," "bottom," "upper," "top," "front," and "back" indicate orientations determined in relation to fully erected carriers.

As described herein, carriers may be formed by multiple overlapping panels, end flaps, and/or other portions of blanks. Such panels, end flaps, and/or other portions of the blank can be designated in relative terms to one another, e.g., "first", "second", "third", etc., in sequential or non-sequential reference, without departing from the disclosure.

Figure 1:
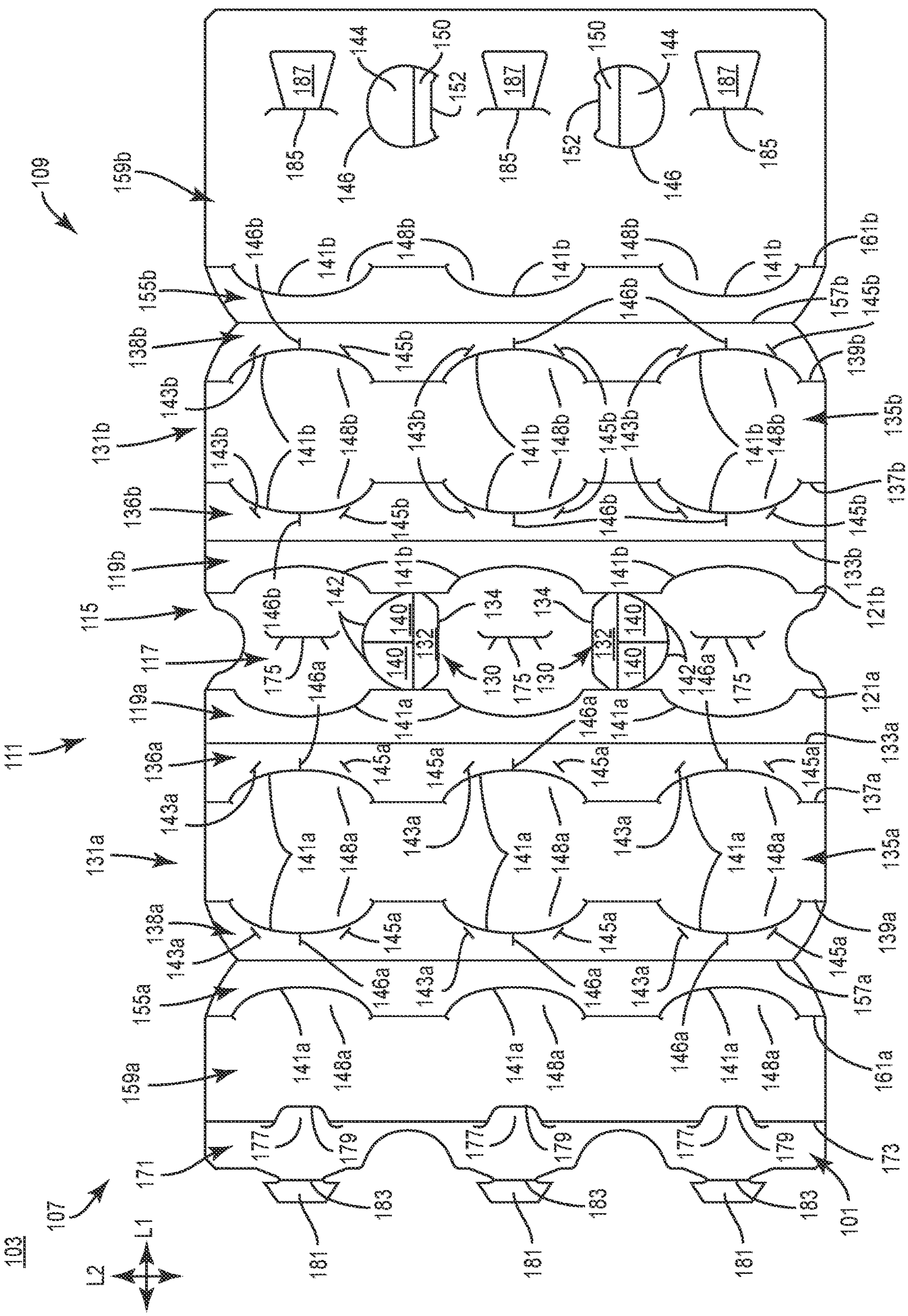
FIG. 1 is a plan view of an outer surface of a blank for forming a carrier and package according to a first exemplary embodiment of the disclosure.
Figure 2:
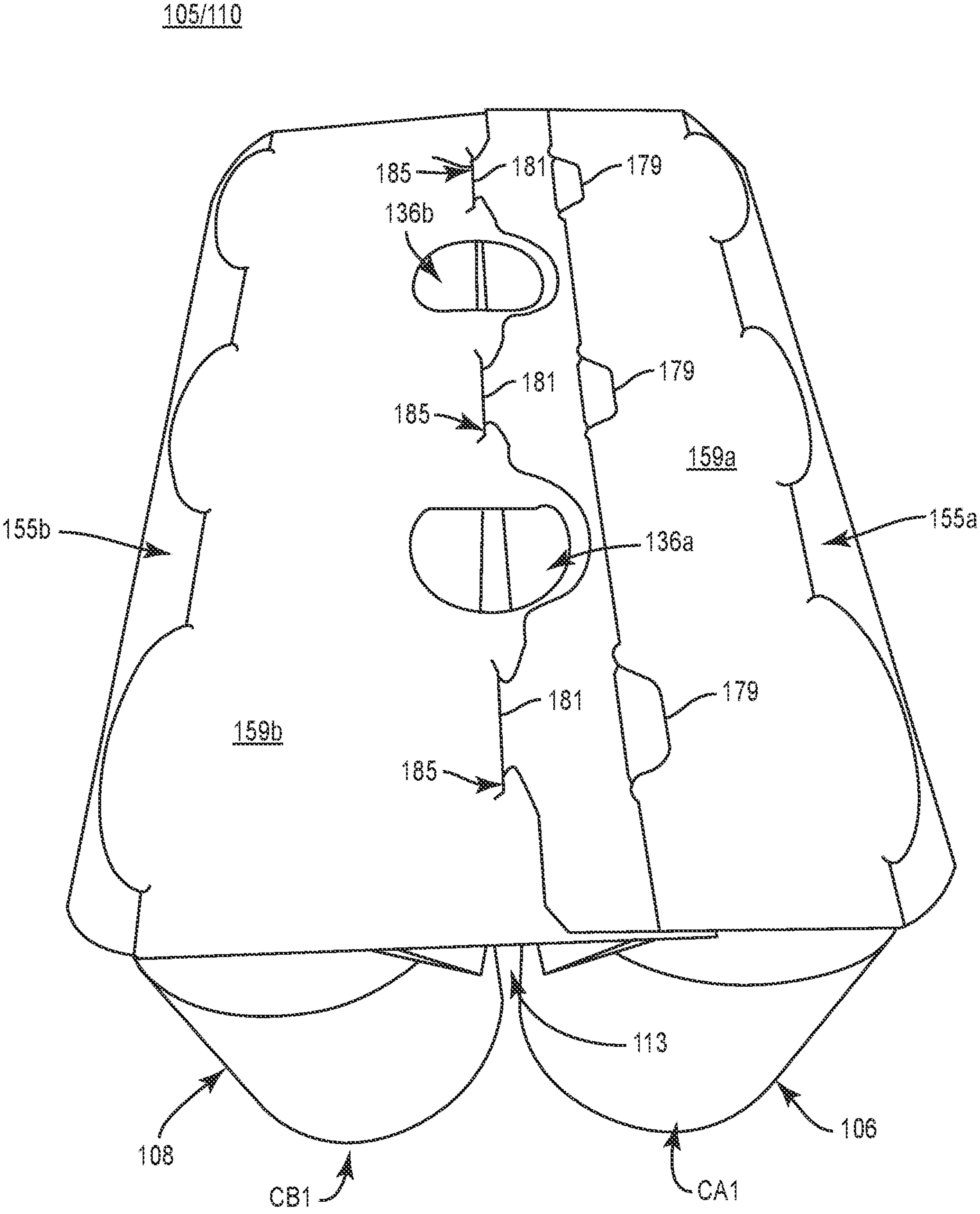
FIG. 2 is a perspective view of a package and carrier formed from the blank of FIG. 1 according to the first exemplary embodiment.

FIG. 1 shows a plan view of an exterior side 101 of a blank 103 used to form a carrier 105 (FIG. 2) in accordance with an exemplary embodiment of the disclosure. As shown in FIG. 2, the carrier 105 is sized to contain or support six containers, with three containers CA1, CA2, CA3 being attached to a front portion 106 of the carrier 105 and three containers CB1, CB2, CB3 being attached to a back portion 108 of the carrier 105. In the illustrated embodiment, the containers CA1, CA2, CA3, CB1, CB2, CB3 can be beverage cans, or could be any other suitable type and size of container without departing from the disclosure.

The carrier 105 can be sized and shaped to hold more or less than six containers. In one embodiment, the front portion 106 and the back portion 108 of the carrier 105 each have three containers, and in other embodiments, the front portion 106 and/or the back portion 108 of the carrier 105 can carry more or less than three containers without departing from the disclosure. The carrier 105 can be provided together with one or more containers as a package 110 (FIG. 2).

As shown in FIG. 1, the blank 103 has a longitudinal axis L1 and a lateral axis L2. The blank 103 has a front portion 107 for forming the front portion 106 of the carrier 105, a back portion 109 for forming the back portion 108 of the carrier 105, and a central or connection portion 111 for forming a central or connection portion 113 of the carrier 105. Accordingly, the central portion 111 of the blank 103/central portion 113 of the carrier 105 can extend from the front portion 107 of the blank 103/front portion 106 of the carrier 105 to the back portion 109 of the blank 103/back portion 108 of the carrier 105. In some embodiments, the central portion 111 of the blank 103/central portion 113 of the carrier 105 can be distinct from the front portion 107/106 and the back portion 109/108 or can form at least a portion of the front portion 107/106 and/or the back portion 109/108.

In the illustrated embodiment, the central portion 111 of the blank 103 includes a central panel 115 having a connection portion 117 foldably connected to a front reinforcement portion 119*a* at a lateral fold line 121*a* that is interrupted by a plurality of laterally-spaced cuts 141*a* that can each include one or more curved and/or angled portions. As described further herein, the central panel 115 also includes a back reinforcement portion 119*b* foldably connected to the connection portion 117 of the central panel 115 at a lateral fold line 121*b* interrupted by a plurality of laterally spaced cuts 141*b* having one or more of curved and/or angled portions. In some embodiments, the cuts 141*a*, 141*b* in the central panel 115 can define tabs that separate from the respective portions 119*a*, 119*b* for being overlaid upon respective containers when the carrier 105 is formed from the blank 103.

As also shown, the central panel 115 of the blank 103 can include a laterally-spaced pair of handle flaps 130 positioned in the connection portion 117. Each handle flap 130, as shown, can include a respective major section 132 foldably connected to the central panel at a respective longitudinal fold line 134, and a respective pair of minor sections 140 foldably connected to the central panel 115 at respective curved fold lines 142. The minor sections 140 of the handle flaps 130 can be separated from each other at respective lateral cuts, and from the respective major section 132 at respective longitudinal cuts. The handle flaps 130 can have a different configuration without departing from the disclosure.

With continued reference to FIG. 1, the front portion 107 of the blank 103 can include a front container retention panel or front attachment panel 131*a* foldably connected to the reinforcement portion 119*a* of the central panel 115 at a lateral fold line 133*a*.

The front attachment panel 131*a* can also include a container retention portion 135*a* that is at least partially defined between a pair of longitudinally-spaced lateral fold lines 137*a*, 139*a* that are each interrupted by a respective plurality of laterally-spaced cuts 141*a* that can each include one or more curved and/or angled portions.

As shown, the laterally-spaced cuts 141*a* can define container retention tabs 148*a* that extend outwardly from the container retention portion 135*a*. As also shown, respective oblique cuts 143*a*, 145*a* can extend outwardly from one or more cuts 141*a* that interrupt the fold line 139*a*. Furthermore, longitudinal cuts 146*a* can extend outwardly from respective central portions of one or more of the cuts 141*a*.

In the aforementioned arrangement, an interior marginal portion 136*a* of the attachment panel 131*a* can be defined between the fold lines 137*a*, 133*a*, and an exterior marginal portion 138*a* of the attachment panel 131*a* is defined between the fold line 139*a* and a lateral fold line 157*a* adjacent the attachment panel 131*a*. In this regard, the interior marginal portion 136*a* of the attachment panel 131*a* is foldably connected to the front reinforcement portion 119*a* of the central panel 115 at the lateral fold lines 133*a*.

A bevel or front side panel 155*a*, as shown, is foldably connected to the front attachment panel 131*a* at the lateral fold line 157*a*, and a top panel 159*a* is foldably connected to the front side panel 155*a* at a lateral fold line 161*a*. The lateral fold line 161*a* can be interrupted by a plurality of the cuts 141*a* so as to define container retention tabs 148*a* protruding from the top panel 159*a*, as described further herein.

The blank 103/carrier 105 formed therefrom can also include a locking flap or locking panel 171 foldably connected to the front top panel 159*a* at a lateral fold line 173.

The blank 103 can also include locking features for forming/maintaining an erected configuration of the carrier 105/package 110 formed from the blank 103. The locking features of the blank 103/carrier 105 formed therefrom can include a plurality of male locking features and a plurality of male locking features, the female locking features configured to at least partially receive a portion of the male locking features therethrough. As shown, the locking features can include a plurality of laterally spaced locking cuts/openings 175 (broadly, "female locking features" or "first female locking feature") interrupting the central panel 115. The cuts/openings 175 can include one or more curved, angled, and or straight portions. In the illustrated embodiment, the cuts/openings 175 can have one or more relief cuts extending therefrom.

Locking features of the blank 103/carrier 105 formed therefrom can also include a plurality of locking tabs 177 (broadly, "male locking features" or "second male locking feature") defined by cuts 179 having one or more curved, angled, and/or straight portions and interrupting the fold line 173 such that the locking tabs 177 extend from the locking panel 171/extend at least partially into the top panel 159*a*.

Still referring to FIG. 1, locking tabs 181 (broadly, "male locking features" or "first male locking feature") can be foldably connected to the locking panel 171 at respective lateral fold lines 183 or can or otherwise extend from the locking flap 171. As shown, the locking tabs 181 can have a base portion that expands to a distal portion or locking head/feature to present multiple locking edges.

In the illustrated embodiment, the back portion 109 of the blank 103 includes a back container retention panel or back attachment panel 131*b*, a back side panel 155*b*, and a back top panel or back attachment flap 159*b* having associated features that are generally a mirror-image of the corresponding portions of the front portion 107 of the blank 103. Corresponding components (e.g., panels, flaps, fold lines, cuts, etc.) have been designated by corresponding reference numbers that differ by the "a" or "b" suffix, with the "a" components corresponding to the front portion 107 of the blank 103 and the "b" components corresponding to the back portion 109 of the blank 103.

The back top panel 159*b*, as shown, can include a plurality of laterally-spaced cuts/openings 185 (broadly, "female locking features" or "second female locking feature" or "fifth female locking feature") having one or more straight, curved, and/or angled portions. Respective locking openings 187 (broadly, "female locking features" or "third female locking feature" or "fourth female locking feature") can extend from the respective cuts 185 toward a lateral free edge of the back top panel 159*b*. While the locking openings 187 are shown having a generally trapezoidal profile, it will be understood that one or more of the locking openings 187 can have a different arrangement without departing from the disclosure.

As also shown, the back top panel 159*b* can include a pair of handle openings 144 and respective handle reinforcement flaps 150 positioned extending into the respective handle openings 144 and foldably connected to the back top panel 159*b* at respective longitudinal fold lines 152.

Any of the panels, flaps, fold lines, cuts, or other features could be otherwise shaped, arranged, and/or omitted from the blank 103 without departing from the disclosure. The blank 103 could be sized and/or shaped to accommodate more or less than six containers without departing from this disclosure.

Figure 3:
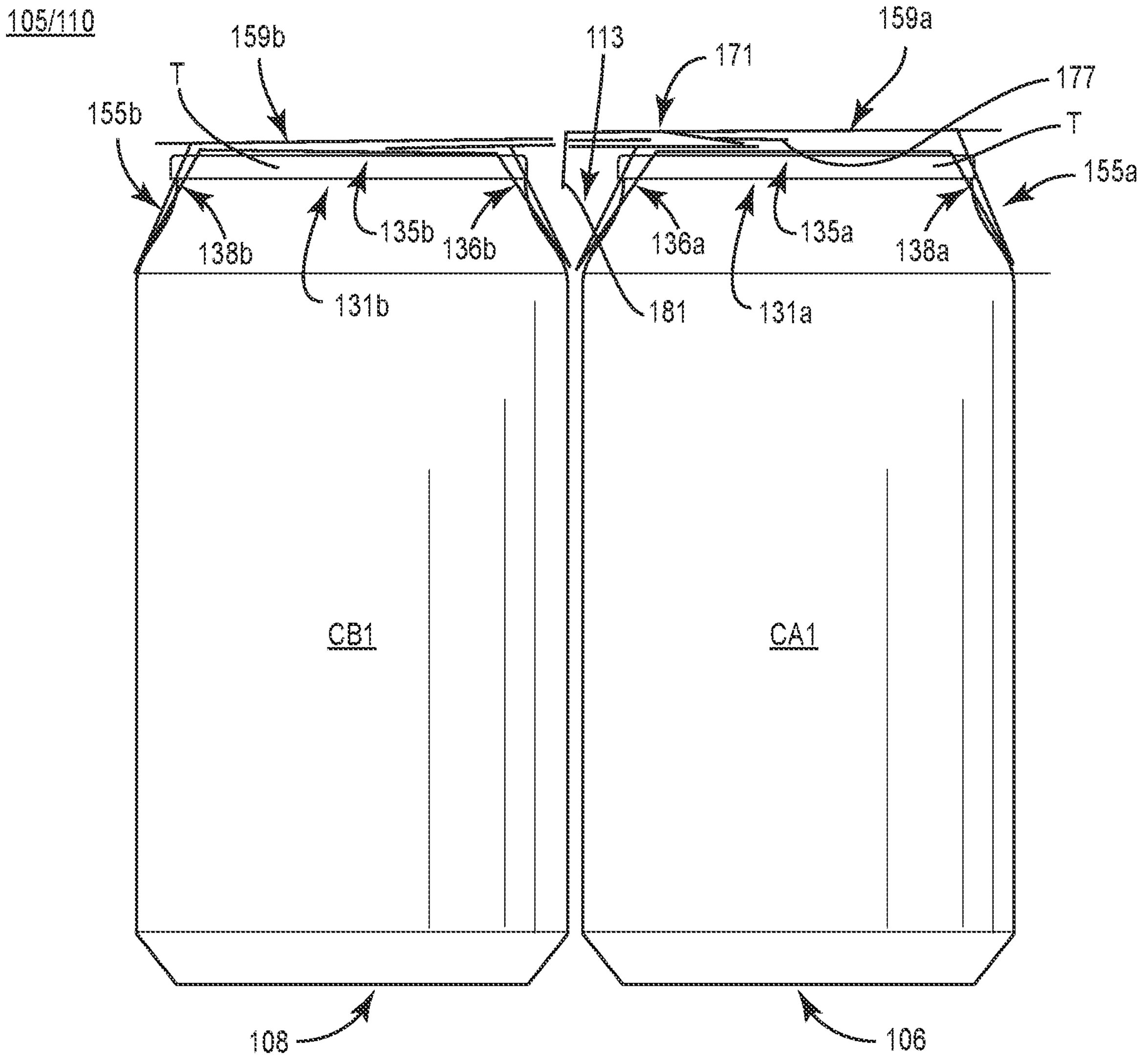
FIG. 3 is a side view of the package and carrier of FIG. 2.
Figure 4:
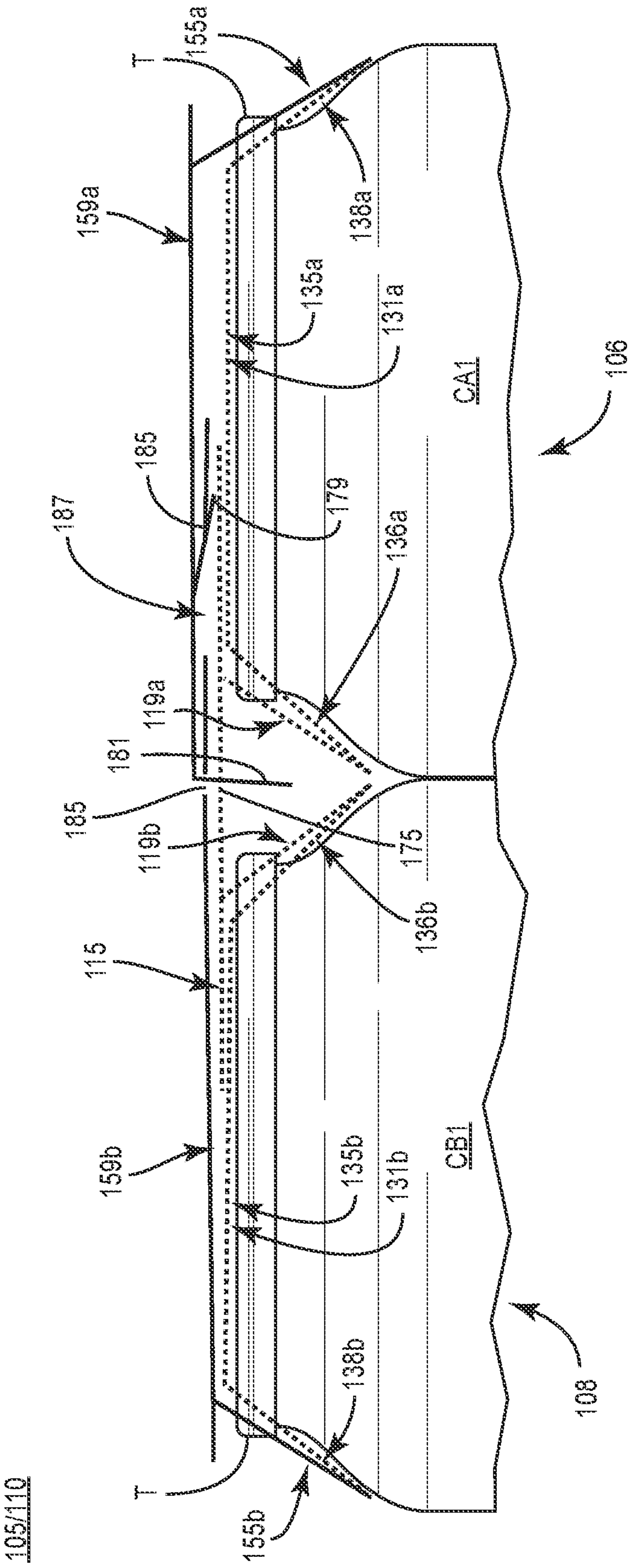
FIG. 4 is a side schematic view of a portion of the package and carrier of FIG. 2.

Turning to FIGS. 2-4, the blank 103 can be inverted such that the exterior surface 101 of the blank 103 can be placed atop the containers CA1, CA2, CA3, CB1, CB2, CB3 such that the container retention portion 135*a* of the front attachment panel 131*a* overlies the containers CA1, CA2, CA3 and such that the container retention portion 135*b* of the back attachment panel 131*b* overlies the containers CB1, CB2, CB3. Further downward positioning of the attachment panels 131*a*, 131*b* over the plurality of containers CA1, CA2, CA3, CB1, CB2, CB3 can activate the respective container retention portions 135*a*, 135*b* to engage respective containers.

For example, as the front attachment panel 131*a* is lowered or urged downwardly onto the containers CA1, CA2, CA3 the container retention portion 135*a* can at least partially separate from the remainder of the front attachment panel 131*a* at the cuts 141*a* interrupting the fold lines 137*a*, 139*a* such that the container retention tabs 148*a* can sit within recessed portions of the containers CA1, CA2, CA3, e.g., recessed tops of the containers CA1, CA2, CA3 below rolled upper rims thereof. In such an arrangement, upper or top portions T of the respective containers CA1, CA2, CA3 can extend at least partially through respective openings formed by the respective cuts 141*a* interrupting the fold line 139*a* as well as through the openings 142*a* interrupting the fold line 137*a*.

The marginal portions 136*a*, 138*a* of the attachment panel 131*a* can fold at least partially downwardly at the respective fold lines 137*a*, 139*a* in such a configuration, and such movement can cause reconfiguration of the outer marginal portion 138*a* of the top attachment panel 131*a* to reconfigure at the respective cuts 143*a*, 145*a*, 146*a* to engage a rolled rim or other top structure of the respective containers CA1, CA2, CA3.

The back attachment panel 131*b* and corresponding container retention portion 135*b* can engage the containers CB1, CB2, CB3 in a similar manner as described above with respect to the engagement of the front attachment panel 131*a* and container retention portion 135*a* with respect to the containers CA1, CA2, CA3.

The aforementioned engagement of the blank 103 with the containers CA1, CA2, CA3, CB1, CB2, CB3 can occur with the front row of containers CA1, CA2, CA3 spaced apart from the back row of containers CB1, CB2, CB3. Upon moving these rows of containers together, the front reinforcement portion 119*a* of the central panel 115 can fold downwardly at the fold line 121*a* relative to the connection portion 117 of the central panel 115, and can further fold at the fold line 133*a* into at least partial face-to-face contact with the interior marginal portion 136*a* of the attachment panel 131*a*.

Similarly, the back reinforcement portion 119*b* of the central panel 115 can fold downwardly at the fold line 121*b* relative to the connection portion 117 of the central panel 115, and can further fold at the fold line 133*b* into at least partial face-to-face contact with the interior marginal portion 136*b* of the attachment panel 131*b*. In such arrangement, portions of the connection portion 117 of the central panel 115 can separate from the reinforcement portions 119*a*, 119*b* at the respective cuts 141*a*, 141*b* and can be positioned to at least partially overlie the openings 142*a*, 142*b* in the respective attachment panels 131*a*, 131*b*.

The aforementioned arrangement of the reinforcement portion 119*a* of the central panel 115 with the interior marginal portion 136*a* of the attachment panel 131*a* and the reinforcement portion 119*b* of the central panel 115 with the interior marginal portion 136*b* of the attachment panel 131*b* can provide a reinforcing structure that is resistant to tearing, bending, bowing, twisting, other deformation, etc., that supports the containers attached to the carrier 105.

Still referring to FIGS. 2-4, the front side panel 155*a* can be folded upwardly at the fold line 157*a*, for example, to be at an oblique arrangement relative to the containers CA1, CA2, CA3, CB1, CB2, CB3 and/or into at least partial face-to-face contact with the exterior marginal portion 138*a* of the attachment panel 131*a*, and the front top panel 159*a* can be folded at the fold line 161*a*. Such movement of the top panel 159*a* can cause the container retention tabs 148*a* to separate from the front side panel 155*a* at the respective cuts 141*a*, and can at least partially overlie the container retention tabs 148*a* associated with the attachment panel 131*a*. In this regard, the rolled rim or other top structure of the respective containers CA1, CA2, CA3 can be at least partially received through the cuts 141*a* along the fold line 161*a* such that the container retention tabs 148*a* extending from the top panel 159*a* can also sit within recessed upper portions of the containers CA1, CA2, CA3.

Similarly, the back side panel 155*b* can be folded upwardly at the fold line 157*b* into an oblique arrangement with the containers CA1, CA2, CA3, CB1, CB2, CB3 and/or into at least partial face-to-face contact with the exterior marginal portion 138*b* of the attachment panel 131*b*, and the top panel 159*b* can be folded at the fold line 161*b* into at least partial face-to-face contact with the attachment panel 131*b*. Such movement of the top panel 159*b* can cause engagement with the containers CB1, CB2, CB3 in a manner similar to that described above with regard to the engagement of the top panel 159*a* with the containers CA1, CA2, CA3.

In the illustrated embodiment, the front top panel 159*a* can ultimately be positioned in at least partial face-to-face contact over the back top panel 159*b*, though it will be understood that the front top panel 159*a* can be at least partially positioned under the back top panel 159*b* without departing from the disclosure.

This positioning of the top panel 159*a* can align the cuts 185 in the back top panel 159*b* over the cuts 175 in the central panel 115. Further, the handle openings 144 in the back top panel 159*b* can be positioned above/aligned with the handle flaps 130 attached to the central panel 115 in such an arrangement.

The aforementioned arrangement of the carrier 105/package 110 can be at least partially formed/maintained via relative engagement of the locking features described above.

In particular, and as shown schematically in FIG. 4, the locking tabs 181 protruding from the locking flap 171 can be at least partially inserted through the cuts 185 in the back top panel 159*b* and further through the cuts/openings 175 in the central panel 115. Such an arrangement can also position the locking tabs 177 protruding from the locking flap 171 for at least partial insertion through the respective locking openings 187 so as to further maintain the arrangement of the carrier 105/package 110. In some embodiments, such positioning of the locking tabs 177 can include at least partially positioning the locking tabs 177 with a machine tool or element, and can involve at least partial insertion through one or more layers of material that form the carrier 105.

In view thereof, the carrier 105/package 110 can be formed/maintained with a reduced/minimized presence of adhesive such as glue owing to the engagement of the locking features thereof. In one embodiment, the carrier 105/package 110 can be formed/maintained without an adhesive such as glue.

In the formed carrier 105/package 110, containers can be engaged by the respective attachment panels 131*a*, 131*b* and can extend below the respective container retention portions 135*a*. In such an arrangement, the containers CA1, CA2, CA3 extend below the container retention portion 135*a* in the front portion 106 of the carrier 105, and the containers CB1, CB2, CB3 extend below the container retention portion 135*b* in the back portion 108 of the carrier 105, with the front top panel 159*a* overlying respective portions of the attachment panels 131*a*, 131*b* and the central panel 115, and with the back top panel 159*b* overlying a portion of the back attachment panel 131*b*.

In this regard, each of the containers CA1, CA2, CA3, CB1, CB2, CB3 is engaged at multiple points and layers by the carrier 105: each container CA1, CA2, CA3 is at least partially received through the cuts 141*a* of the attachment panel 131*a* so as to be in engagement with respective edges and surfaces associated therewith as well as being received through the cuts 141*a* in the front side panel 155*a*/top panel 159*a* so as to be in engagement with respective edges and surfaces associated therewith; and each container CB1, CB2, CB3 is at least partially received through the cuts 141*b* of the attachment panel 131*b* so as to be in engagement with respective edges and surfaces associated therewith as well as being received through the cuts 141*b* in the front side panel 155*b*/top panel 159*b* so as to be in engagement with respective edges and surfaces associated therewith.

Such a multi-ply, e.g., two ply, clipping engagement of the carrier 105 with the containers provides a reinforced arrangement that secures the containers to the carrier 105 and resists unwanted or unintentional disengagement of containers from the carrier 105.

Furthermore, the row of containers CA1, CA2, CA3 in the front portion 106 of the carrier 105/package 110 and the row of containers CB1, CB2, CB3 in the back portion 108 of the carrier 105/package 110 are joined the engagement of the top panels 159*a*, 159*b* and the connection portion 117 of the central panel 115, but are separated therebelow so as to be free to tilt, swing, or otherwise move relative to one another. Owing to the two-ply clipping engagement of the carrier 105 with the containers, the carrier 105 minimizes/resists/avoids/prevents inadvertent or unwanted disengagement of the containers from the carrier 105 due to incidental movement of the containers during transportation, carrying, etc. of the carrier 105/package 110.

Still referring to FIGS. 2-4, the carrier 105 can be grasped by inserting a user's fingers through the respective handle opening 144 to contact the respective handle flaps 130 and cause at least partial separation thereof from the central panel 115 to provide openings through which the user's finger(s) can further extend to contact the bottom of the carrier 105/package 110, e.g., at a portion of the central panel 115.

In one embodiment, one or more of the handle reinforcement flap 150 and portions 132, 136, 138 of the handle flaps 130 can be positioned between a user's finger(s) and the underside of the carrier 105/package 110, e.g., for comfort, to avoid pinching, etc. and/or to provide a reinforced structure for engagement by the user that is resistant to tearing or other deformation due to carrying stresses.

In one embodiment, movement of the user's fingers through the handle openings 144/openings formed by movement of one or more of the portions 132, 140 of the handle flaps 130 can cause longitudinally adjacent containers to tilt away from one another to provide additional clearance for the user's fingers. In another embodiment, portions of the central panel 115 exposed through the handle openings 144/openings formed by movement of one or more of the portions 132, 140 of the handle flaps 130 can be provided with printed graphics or indicia so as to coordinate with an overall aesthetic of the carrier 105/package 110, to provide advertising or pricing information, etc.

The package 110/carrier 105 described above has a compact structure that can, for example, provide materials savings and waste reduction, e.g., by minimizing an amount of adhesive required to form/maintain the erected configuration of the carrier 105/package 110 and the engagement of the container therewith. Further, the exposure of one or more portions of the containers CA1, CA2, CA3, CB1, CB2, CB3 on exterior portions of the carrier 105/package 110 provides a consumer with a clear view of labeling or surface graphics associated with the containers CA1, CA2, CA3, CB1, CB2, CB3 as well as providing convenient access to remove one or more of the containers CA1, CA2, CA3, CB1, CB2, CB3 from the carrier 105/package 110, for example, by withdrawing a respective container through the respective cuts 141*a*, 141*b*/openings 142*a*, 142*b* to disengage the container from the respective panel 159*a*, 159*b*, 131*a*, 131*b*.

Figure 5:
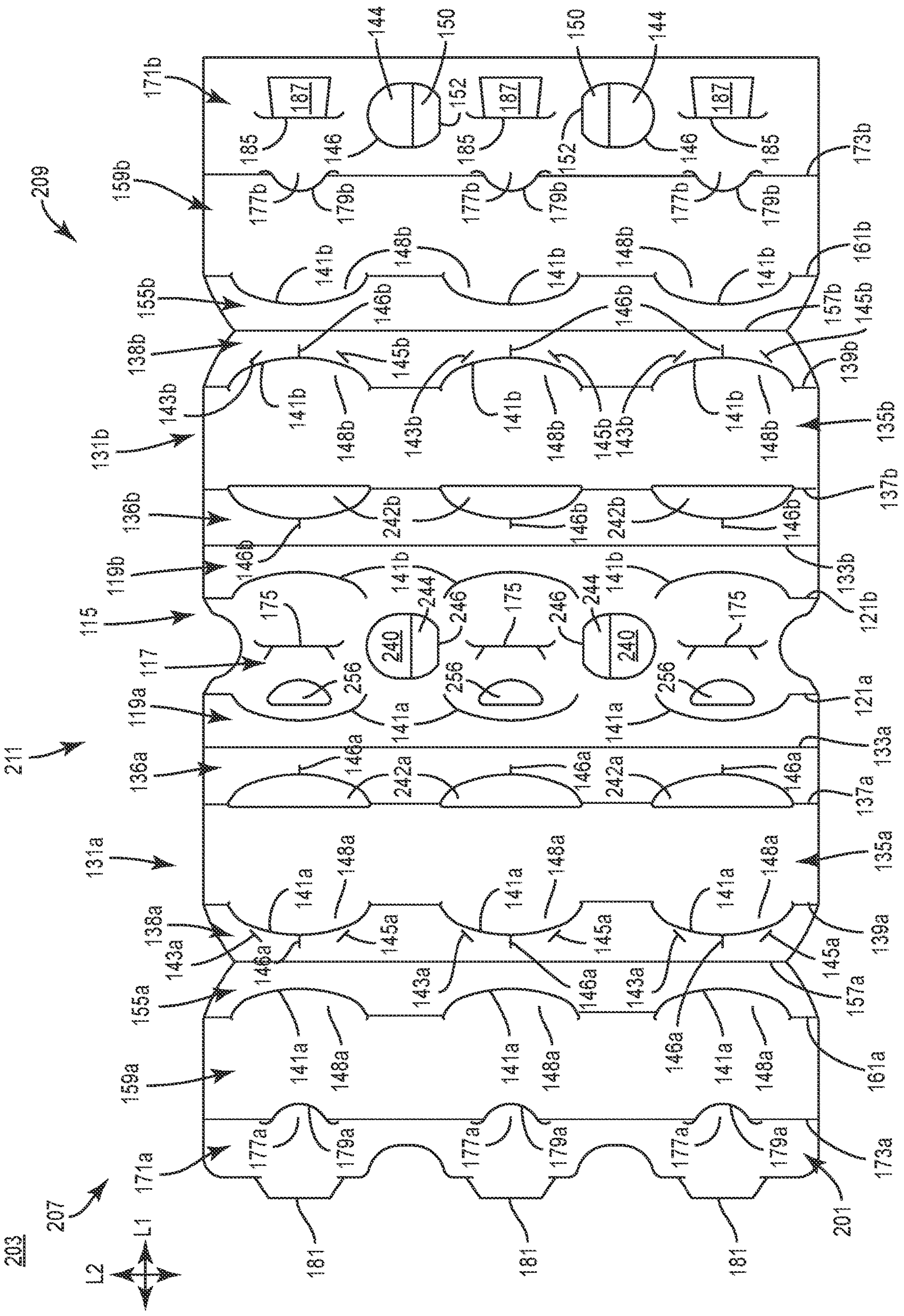
FIG. 5 is a plan view of an outer surface of a blank for forming a carrier and package according to a second exemplary embodiment of the disclosure.
Figure 6:
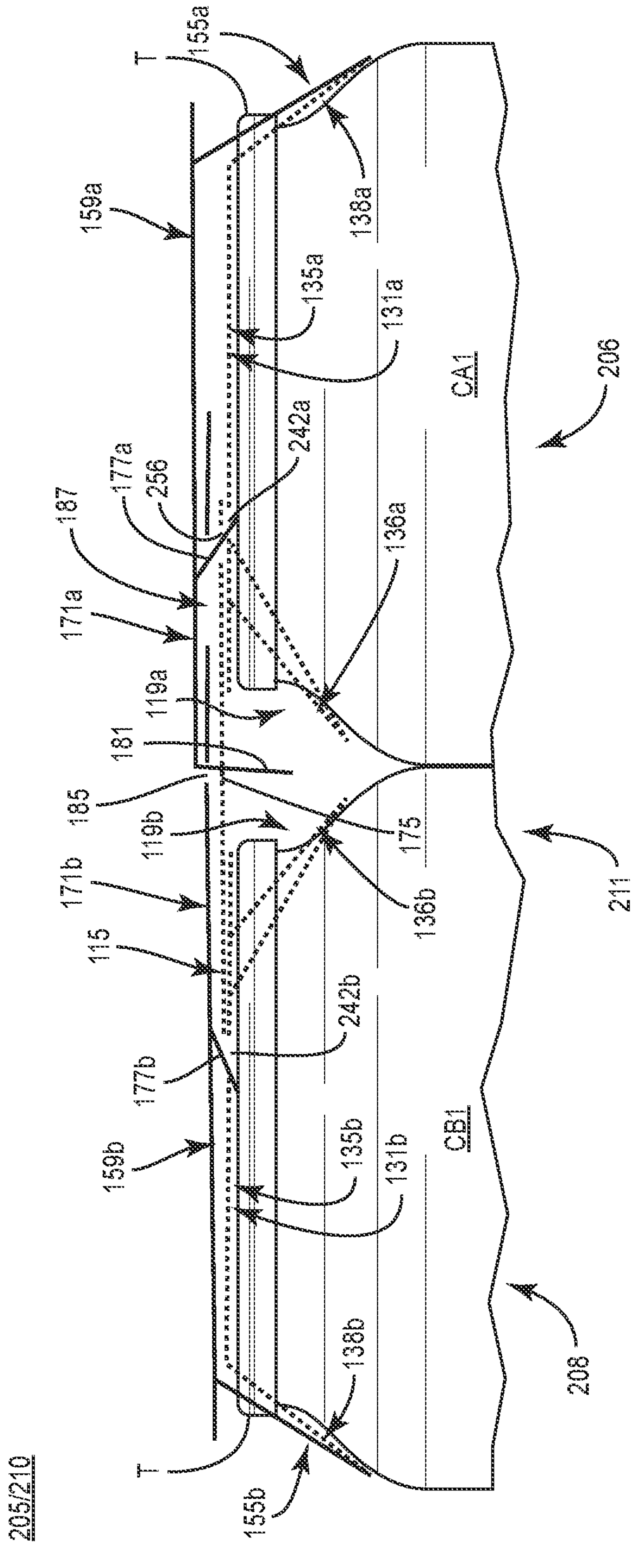
FIG. 6 is a side schematic view of a portion of a package and carrier formed form the blank of FIG. 5 according to the second exemplary embodiment.

Turning to FIG. 5, an exterior surface 201 of a blank 203 for forming a carrier 205 (FIG. 6) according to a second exemplary embodiment of the disclosure is illustrated. The blank 203 and carrier 205 formed therefrom can have one or more features that are the same or similar to those described above with respect to the blank 103 and carrier 105, and like or similar features are designated with like or similar reference numerals. The carrier 205 can be provided with one or more containers to form a package 210 (FIG. 6).

Accordingly, the blank 203 can include a front portion 207 for forming a front portion 206 of the carrier 205/package 210, a back portion 209 for forming a back portion 208 of the carrier 205/package 210, and a central portion 211 for forming a central portion 213 of the carrier 205/package 210 that extends from the front portion 206 to the back portion 208.

The blank 203 can have the longitudinal axis L1 and the lateral axis L2, the central panel 115, the attachment panels 131*a*, 131*b*, the side panels 155*a*, 155*b*, the top panels 159*a*, 159*b*, the locking panel 171, and associated features.

In the illustrated embodiment, the locking panel 171 can be a front locking panel 171*a* foldably connected to the front top panel 159*a* at a lateral fold line 173*a*, and the plurality of panels of the blank 203/carrier 205 can further include a back locking panel 171*b* foldably connected to the back top panel 159*b* at a lateral fold line 173*a*.

Additionally, the cuts 185, locking openings 187, handle openings 144, handle reinforcement flaps 150, and associated features can be positioned in the back locking panel 171*b* of the blank 203/carrier 205. The handle features associated with the back locking panel 171*b* can be laterally aligned with respective handle features in the central panel 115, which can include a series of laterally spaced handle openings 240 with respective handle reinforcement flaps 244 positioned extending into the respective openings 240, the flaps 244 foldably connected to the central panel 115 at respective longitudinal fold lines 246.

With continued reference to FIG. 6, the cuts interrupting the fold line 137*a* extending along respective portions of the attachment panel 131*a* can be at least partially enclosed cutouts having a semicircular or at least partially circular profile that form locking openings 242*a* (broadly, "female locking features" or "third female locking features") at least partially defined in the attachment panel 131*a*. Similarly, the cuts interrupting the fold line 137*b* extending along respective portions of the attachment panel 131*b* can have a similar configuration so as to form locking openings 242*b* (broadly, "female locking features" or "sixth female locking features") at least partially defined in the attachment panel 131*b*.

The blank 203 and carrier 205 formed therefrom can also include a respective series of laterally spaced apart locking openings 256 (broadly, "female locking features" or "second female locking features") at least partially defined in the connection portion 117 of the central panel 115, positioned longitudinally spaced away from the respective cuts 175.

In addition, the locking tabs 177 extending from the locking panel 171*a* and interrupting the fold line 173*a* can be front locking tabs 177*a* (broadly, "male locking features" or "second male locking feature"), and a series of laterally spaced locking tabs 177*b* (broadly, "male locking features" or "third male locking feature") can be defined by respective cuts 179*b* interrupting the fold line 173*b* so as to extend from the back locking panel 171*b*.

In this regard, the blank 203 and carrier 205/package 210 formed therefrom can have a different number and arrangement of panels, handle features, and locking features as compared to the blank 103 and carrier 105/package 110 described above. It will be understood that the blank 203/carrier 205/package 210 can have a further different arrangement and/or configuration without departing from the disclosure.

With additional reference to FIG. 6, the blank 203 can be formed into the carrier 205/package 210 in a manner similar to that described above with regard to the formation of the carrier 105/package 110 from the blank 103. For example, the containers CA1, CA2, CA3, CB1, CB2, CB3 can be at least partially received through openings formed in the respective attachment panels 131*a*, 131*b* via relative folding of one or more portions thereof as described above, e.g., through the cuts 141*a*, 141*b* and openings 242*a*, 242*b*. The side panels 155*a*, 155*b* can further be positioned in generally oblique relation to respective portions of the attachment panels 131*a*, 131*b* as described above, and the top panels 159*a*, 159*b* can be positioned in at least partial face-to-face contact with respective portions of the attachment panels 131*a*, 131*b* as described above. Such movement of the top panels 159*a*, 159*b* can carry the locking panels 171*a*, 171*b* into at least partially overlapping and face-to-face contact over the central panel 115.

During the course of the formation of the carrier 205/package 210 from the blank 203 as described above, the respective attachment portions 135*a*, 135*b* of the respective attachment panels 131*a*, 131*b* can be drawn closer to the connection portion 117 of the central panel 115 as the marginal portion 136*a* of the attachment panel 131*a* is positioned into at least partial face-to-face contact with the reinforcement portion 119*a* of the central panel 115 and as the marginal portion 136*b* of the attachment panel 131*b* is positioned in at least partial face-to-face contact with the reinforcement portion 119*b* of the central panel 115. In this regard, respective portions of the connection portion 117 of the central panel 115 can be positioned overlapping respective portions of the attachment portions 135*a*, 135*b* of the respective attachment panels 131*a*, 131*b*.

In such an arrangement, the cuts 185 in the back locking panel 171*b* can be aligned over the cuts 175 in the central panel 115. Further, the locking openings 256 can align above respective portions of the locking openings 242*a*, and respective portions of the locking openings 187 can be aligned over the locking openings 256 in the central panel 115 and locking openings 242*a* in the front attachment panel 131*a*.

As shown in the schematic view of FIG. 6, in which underlapped panels are illustrated in broken lines for clarity, the locking tabs 177*a* can be separated from the front top panel 159*a* at the respective cuts 179*a* and inserted/received at least partially through the respective locking openings 187 in the back locking panel 171*b*, the locking openings 256 in the central panel 115 aligned therebelow, and the locking openings 242*a* in the front attachment panel 131*a* aligned therebelow such that the locking tabs 177*a* are tucked under the front attachment panel 131*a*. In some embodiments, the locking tabs 177*a* can extend into the recessed top portion of a respective container below the respective portion of the attachment panel 131*a*.

The locking tabs 177*b* can also be separated from the back top panel 159*b* at respective cuts 179*b* and positioned to be inserted/received at least partially through the locking openings 142*b* in the back attachment panel 131*b* so as to be at least partially tucked under the back attachment panel 131*b*. In some embodiments, the locking tabs 177*b* can extend into the recessed top portion of a respective container below the respective portion of the attachment panel 131*b*.

Further, the locking tabs 181 extending from the locking panel 171*a* can be positioned to be inserted/received at least partially through the cut 185 in the back locking panel 171*b* and further through the cut 175 in the central panel 115 therebelow so as to extend below and/or be tucked under the central panel 115. In some embodiments, the locking tabs 181 can be at least partially bend/folded relative to the locking panel 171*a* in the course of such positioning through the cuts 185, 175.

In use, the carrier 205 can be grasped by inserting a user's fingers through the respective handle opening 144 and handle opening 240 aligned therebelow to facilitate passage for the user to contact the bottom of the carrier 205/package 210, e.g., at a portion of the central panel 115. Such movement of a user's finger(s) through the carrier 205 can cause the handle reinforcement flap 150 and the handle reinforcement flap 244 to fold downwardly at the respective fold lines 152, 246 to become positioned between the user's finger(s) and the underside of the carrier 205/package 210, e.g., for comfort, to avoid pinching, etc. and/or to provide a reinforced structure for engagement by the user that is resistant to tearing or other deformation due to carrying stresses.

The aforementioned construction of the carrier 205/package 210 can provide a robust and secured engagement of the various panels and portions thereof to support one or more of the containers with advantages similar to those described above with regard to the carrier 105/package 110. In some embodiments, such a construction of the carrier 205/package 210 can be provided so as to avoid or minimize the use of polymeric materials such as adhesives, e.g., glue.

It will be understood that the blanks and carriers described herein can be provided in different configurations without departing from the disclosure.

In general, the blank may be constructed from paperboard having a caliper so that it is heavier and more rigid than ordinary paper. The blank can also be constructed of other materials, such as cardboard, or any other material having properties suitable for enabling the carrier to function at least generally as described above. The blank can be coated with, for example, a clay coating. The clay coating may then be printed over with product, advertising, and other information or images. The blanks may then be coated with a varnish to protect information printed on the blanks. The blanks may also be coated with, for example, a moisture barrier layer, on either or both sides of the blanks. The blanks can also be laminated to or coated with one or more sheet-like materials at selected panels or panel sections.

As an example, a tear line can include: a slit that extends partially into the material along the desired line of weakness, and/or a series of spaced apart slits that extend partially into and/or completely through the material along the desired line of weakness, or various combinations of these features. As a more specific example, one type tear line is in the form of a series of spaced apart slits that extend completely through the material, with adjacent slits being spaced apart slightly so that a nick (e.g., a small somewhat bridging-like piece of the material) is defined between the adjacent slits for typically temporarily connecting the material across the tear line. The nicks are broken during tearing along the tear line. The nicks typically are a relatively small percentage of the tear line, and alternatively the nicks can be omitted from or torn in a tear line such that the tear line is a continuous cut line. That is, it is within the scope of the present disclosure for each of the tear lines to be replaced with a continuous slit, or the like. For example, a cut line can be a continuous slit or could be wider than a slit without departing from the present disclosure.

In accordance with the exemplary embodiments, a fold line can be any substantially linear, although not necessarily straight, form of weakening that facilitates folding therealong. More specifically, but not for the purpose of narrowing the scope of the present disclosure, fold lines include: a score line, such as lines formed with a blunt scoring knife, or the like, which creates a crushed or depressed portion in the material along the desired line of weakness; a cut that extends partially into a material along the desired line of weakness, and/or a series of cuts that extend partially into and/or completely through the material along the desired line of weakness; and various combinations of these features. In situations where cutting is used to create a fold line, typically the cutting will not be overly extensive in a manner that might cause a reasonable user to incorrectly consider the fold line to be a tear line.

The above embodiments may be described as having one or more panels adhered together by glue during erection of the carrier embodiments. The term "glue" is intended to encompass all manner of adhesives commonly used to secure carrier panels in place.

The foregoing description of the disclosure illustrates and describes various exemplary embodiments. Various additions, modifications, changes, etc., could be made to the exemplary embodiments without departing from the spirit and scope of the disclosure. It is intended that all matter contained in the above description or shown in the accompanying drawings shall be interpreted as illustrative and not in a limiting sense. Additionally, the disclosure shows and describes only selected embodiments of the disclosure, but the disclosure is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure.

What is claimed is:

1. A carrier for holding a plurality of containers, the carrier comprising:

a plurality of panels forming a front portion, a back portion, and a central portion extending from the front portion to the back portion, the front portion comprising a front attachment panel for at least partially receiving a respective container of the plurality of containers and a front top panel at least partially overlapping the front attachment panel, the back portion comprising a back attachment panel for at least partially receiving a respective container of the plurality of containers and a back top panel at least partially overlapping the back attachment panel, the central portion comprising a central panel; and locking features for maintaining an erected configuration of the carrier, the locking features comprising at least one male locking feature extending from a respective panel of the plurality of panels and being at least partially received in a respective at least one female locking feature at least partially defined in a respective panel of the plurality of panels.

2. The carrier of claim 1, wherein the front top panel is in at least partial face-to-face contact with the front attachment panel and the back top panel is in at least partial face-to-face contact with the back attachment panel.

3. The carrier of claim 2, wherein the plurality of panels further comprises a front side panel foldably connected to each of the front attachment panel and the front top panel, and the plurality of panels further comprises a back side panel foldably connected to the each of the back attachment panel and the back top panel.

4. The carrier of claim 2, wherein the plurality of panels further comprises a locking panel foldably connected to the front top panel, the at least one male locking feature extending from the locking panel.

5. The carrier of claim 4, wherein the at least one female locking feature is at least partially defined in the central panel.

6. The carrier of claim 5, wherein the at least one male locking feature is at least one locking tab and the at least one female locking feature is at least one cut.

7. The carrier of claim 5, wherein the at least one female locking feature is a first female locking feature, and the locking features further comprise a second female locking feature at least partially defined in the back top panel, the second female locking feature aligned with the first female locking feature such that each of the first female locking feature and the second female locking feature at least partially receive the at least one male locking feature.

8. The carrier of claim 7, wherein the at least one male locking feature is a first male locking feature, the locking features further comprise a second male locking feature extending from the locking panel and a third female locking feature at least partially defined in the back top panel and at least partially receiving the second male locking feature.

9. The carrier of claim 5, wherein the at least one female locking feature is a first female locking feature, the locking features further comprise a second female locking feature at least partially defined in the central panel and spaced apart from the first female locking feature, the at least one male locking feature is a first male locking feature extending from the locking panel, and the locking features further comprise a second male locking feature extending from the locking panel and at least partially received in the second female locking feature.

10. The carrier of claim 9, wherein the locking features further comprise a third female locking feature at least partially defined in the front attachment panel, the third female locking feature aligned with the second female locking feature, each of the third female locking feature and the second female locking feature at least partially receiving the second male locking feature.

11. The carrier of claim 10, wherein the locking panel is a front locking panel and the plurality of panels further comprises a back locking panel foldably connected to the back top panel, the locking features further comprise a fourth female locking feature at least partially defined in the back locking panel and aligned with each of the third female locking feature and the second female locking feature such that each of the fourth female locking feature, the third female locking feature, and the second female locking feature at least partially receives the second male locking feature.

12. The carrier of claim 11, wherein the locking features further comprise a fifth female locking feature at least partially defined in the back locking panel, the fifth female locking feature aligned with the first female locking feature such that each of the first female locking feature and the fifth female locking feature at least partially receives the first male locking feature.

13. The carrier of claim 12, wherein the locking features further comprise a third male locking feature extending from the back top panel and a sixth female locking feature at least partially defined in the back attachment panel, the sixth female locking feature at least partially receiving the third male locking feature.

14. A carrier for holding a plurality of containers, the carrier comprising:

a plurality of panels forming a front portion, a back portion, and a central portion extending from the front portion to the back portion, the front portion comprising a front attachment panel for at least partially receiving a respective container of the plurality of containers, the back portion comprising a back attachment panel for at least partially receiving a respective container of the plurality of containers, the central portion comprising a central panel foldably connected to each of the front attachment panel and the back attachment panel, the central panel comprises a connection portion foldably connected to each of a front reinforcement portion and a back reinforcement portion; and locking features for maintaining an erected configuration of the carrier, the locking features comprising at least one male locking feature extending from a respective panel of the plurality of panels and being at least partially received in a respective at least one female locking feature at least partially defined in a respective panel of the plurality of panels.

15. The carrier of claim 14, wherein the front reinforcement portion is foldably connected to the front attachment panel and the back reinforcement portion is foldably connected to the back attachment panel.

16. The carrier of claim 15, wherein the front attachment panel comprises an attachment portion, an interior marginal portion foldably connected to the attachment portion, and an exterior marginal portion foldably connected to the attachment portion, the front reinforcement portion of the central panel is foldably connected to and in at least partial face-to-face contact with the interior marginal portion of the front attachment panel.

17. The carrier of claim 16, wherein the back attachment panel comprises an attachment portion, an interior marginal portion foldably connected to the attachment portion of the back attachment panel, and an exterior marginal portion foldably connected to the attachment portion of the back attachment panel, the back reinforcement portion of the central panel is foldably connected to and in at least partial face-to-face contact with the interior marginal portion of the back attachment panel.

18. A blank for forming a carrier for holding a plurality of containers, the blank comprising:

a plurality of panels forming a front portion, a back portion, and a central portion extending from the front portion to the back portion, the front portion comprising a front attachment panel for at least partially receiving a respective container of the plurality of containers and a front top panel for being overlapped with the front attachment panel when the carrier is formed from the blank, the back portion comprising a back attachment panel for at least partially receiving a respective container of the plurality of containers and a back top panel for being overlapped with the back attachment panel when the carrier is formed from the blank, the central portion comprising a central panel; and locking features for maintaining an erected configuration of the carrier formed from the blank, the locking features comprising at least one male locking feature extending from a respective panel of the plurality of panels and for being at least partially received in a respective at least one female locking feature at least partially defined in a respective panel of the plurality of panels when the carrier is formed from the blank.

19. The blank of claim 18, wherein the front top panel is for being positioned in at least partial face-to-face contact with the front attachment panel when the carrier is formed from the blank and the back top panel is for being positioned in at least partial face-to-face contact with the back attachment panel when the carrier is formed from the blank.

20. The blank of claim 19, wherein the plurality of panels further comprises a front side panel foldably connected to each of the front attachment panel and the front top panel, and the plurality of panels further comprises a back side panel foldably connected to the each of the back attachment panel and the back top panel.

21. The blank of claim 19, wherein the plurality of panels further comprises a locking panel foldably connected to the front top panel, the at least one male locking feature extending from the locking panel.

22. The blank of claim 21, wherein the at least one female locking feature is at least partially defined in the central panel.

23. The blank of claim 22, wherein the at least one male locking feature is at least one locking tab and the at least one female locking feature is at least one cut.

24. The blank of claim 22, wherein the at least one female locking feature is a first female locking feature, the locking features further comprise a second female locking feature at least partially defined in the back top panel, the second female locking feature for being aligned with the first female locking feature such that each of the first female locking feature and the second female locking feature at least partially receives the at least one male locking feature when the carrier is formed from the blank.

25. The blank of claim 24, wherein the at least one male locking feature is a first male locking feature and the locking features further comprise a second male locking feature extending from the locking panel and a third female locking feature at least partially defined in the back top panel for at least partially receiving the second male locking feature when the carrier is formed from the blank.

26. The blank of claim 22, wherein the at least one female locking feature is a first female locking feature, the locking features further comprise a second female locking feature at least partially defined in the central panel and spaced apart from the first female locking feature, the at least one male locking feature is a first male locking feature extending from the locking panel, and the locking features further comprise a second male locking feature extending from the locking panel, the second male locking feature for being at least partially received in the second female locking feature when the carrier is formed from the blank.

27. The blank of claim 26, wherein the locking features further comprise a third female locking feature at least partially defined in the front attachment panel, the third female locking feature for being aligned with the second female locking feature when the carrier is formed from the blank such that each of the third female locking feature and the second female locking feature are for at least partially receiving the second male locking feature when the carrier is formed from the blank.

28. The blank of claim 27, wherein the locking panel is a front locking panel and the plurality of panels further comprises a back locking panel foldably connected to the back top panel, the locking features further comprise a fourth female locking feature at least partially defined in the back locking panel and for being aligned with each of the third female locking feature and the second female locking feature when the carrier is formed from the blank such that each of the fourth female locking feature, the third female locking feature, and the second female locking feature are for at least partially receiving the second male locking feature when the carrier is formed from the blank.

29. The blank of claim 28, wherein the locking features further comprise a fifth female locking feature at least partially defined in the back locking panel, the fifth female locking feature for being aligned with the first female locking feature when the carrier is formed from the blank such that each of the first female locking feature and the fifth female locking feature are for at least partially receiving the first male locking feature when the carrier is formed from the blank.

30. The blank of claim 29, wherein the locking features further comprise a third male locking feature extending from the back top panel and a sixth female locking feature at least partially defined in the back attachment panel, the sixth female locking feature for at least partially receiving the third male locking feature when the carrier is formed from the blank.

31. A blank for forming a carrier for holding a plurality of containers, the blank comprising:

a plurality of panels forming a front portion, a back portion, and a central portion extending from the front portion to the back portion, the front portion comprising a front attachment panel for at least partially receiving a respective container of the plurality of containers, the back portion comprising a back attachment panel for at least partially receiving a respective container of the plurality of containers, the central portion comprising a central panel foldably connected to each of the front attachment panel and the back attachment panel, the central panel comprises a connection portion foldably connected to each of a front reinforcement portion and a back reinforcement portion.

32. The blank of claim 31, wherein the front reinforcement portion is foldably connected to the front attachment panel and the back reinforcement portion is foldably connected to the back attachment panel.

33. The blank of claim 32, wherein the front attachment panel comprises an attachment portion, an interior marginal portion foldably connected to the attachment portion, and an exterior marginal portion foldably connected to the attachment portion, the front reinforcement portion of the central panel is foldably connected to the interior marginal portion of the front attachment panel and for being positioned in at least partial face-to-face contact with the interior marginal portion of the front attachment panel when the carrier is formed from the blank.

34. The blank of claim 33, wherein the back attachment panel comprises an attachment portion, an interior marginal portion foldably connected to the attachment portion of the back attachment panel, and an exterior marginal portion foldably connected to the attachment portion of the back attachment panel, the back reinforcement portion of the central panel is foldably connected to the interior marginal portion of the back attachment panel and for being positioned in at least partial face-to-face contact with the interior marginal portion of the back attachment panel when the carrier is formed from the blank.

35. A method of forming a carrier for holding a plurality of containers, the method comprising:

obtaining a blank comprising a plurality of panels comprising a front attachment panel, a central panel, a back attachment panel, a front top panel, and a back top panel, the blank comprising locking features comprising at least one male locking feature extending from a respective panel of the plurality of panels and at least one female locking feature at least partially defined in a respective panel of the plurality of panels;

arranging the plurality of panels to form a front portion of the carrier comprising the front top panel overlapping the front attachment panel;

arranging the plurality of panels to form a back portion of the carrier comprising the back top panel overlapping the back attachment panel;

arranging the plurality of panels to form a central portion of the carrier comprising the central panel and extending from the front portion of the carrier to the back portion of the carrier; and at least partially inserting the at least one male locking feature through the at least one female locking feature to maintain an erected configuration of the carrier.

36. The method of claim 35, further comprising positioning the front top panel in at least partial face-to-face contact with the front attachment panel, the method further comprising positioning the back top panel in at least partial face-to-face contact with the back attachment panel.

37. The method of claim 36, wherein the plurality of panels further comprises a front side panel foldably connected to each of the front attachment panel and the front top panel, and the plurality of panels further comprises a back side panel foldably connected to the each of the back attachment panel and the back top panel.

38. The method of claim 36, wherein the plurality of panels further comprises a locking panel foldably connected to the front top panel, the at least one male locking feature extending from the locking panel.

39. The method of claim 38, wherein the at least one female locking feature is at least partially defined in the central panel.

40. The method of claim 39, wherein the at least one male locking feature is at least one locking tab and the at least one female locking feature is at least one cut.

41. The method of claim 39, wherein the at least one female locking feature is a first female locking feature, and the locking features further comprise a second female locking feature at least partially defined in the back top panel, and positioning the back top panel comprises aligning the second female locking feature with the first female locking feature such that each of the first female locking feature and the second female locking feature at least partially receives the at least one male locking feature.

42. The method of claim 41, wherein the at least one male locking feature is a first male locking feature, the locking features further comprise a second male locking feature extending from the locking panel and a third female locking feature at least partially defined in the back top panel, and the method further comprises at least partially inserting the second male locking feature in the third female locking feature.

43. The method of claim 39, wherein the at least one female locking feature is a first female locking feature, the locking features further comprise a second female locking feature at least partially defined in the central panel and spaced apart from the first female locking feature, the at least one male locking feature is a first male locking feature extending from the locking panel, the locking features further comprise a second male locking feature extending from the locking panel, and the method further comprises at least partially inserting the second male locking feature through the second female locking feature.

44. The method of claim 43, wherein the locking features further comprise a third female locking feature at least partially defined in the front attachment panel, arranging the plurality of panels comprises aligning the third female locking feature with the second female locking feature, and the method further comprises at least partially inserting the second male locking feature at least partially through each of the third female locking feature and the second female locking feature.

45. The method of claim 44, wherein the locking panel is a front locking panel and the plurality of panels further comprises a back locking panel foldably connected to the back top panel, the locking features further comprise a fourth female locking feature at least partially defined in the back locking panel, arranging the plurality of panels comprises aligning the fourth female locking feature with each of the third female locking feature and the second female locking feature, and the method further comprises at least partially inserting the second male locking feature through each of the fourth female locking feature, the third female locking feature, and the second female locking feature.

46. The method of claim 45, wherein the locking features further comprise a fifth female locking feature at least partially defined in the back locking panel, arranging the plurality of panels comprises aligning the fifth female locking feature with the first female locking feature, and the method further comprises at least partially inserting the first male locking feature through each of the first female locking feature and the fifth female locking feature.

47. The method of claim 46, wherein the locking features further comprise a third male locking feature extending from the back top panel and a sixth female locking feature at least partially defined in the back attachment panel, and the method further comprises at least partially inserting the third male locking feature through the sixth female locking feature.

48. A method of forming a carrier for holding a plurality of containers, the method comprising:

obtaining a blank comprising a plurality of panels comprising a front attachment panel, a central panel foldably connected to each of the front attachment panel and the back attachment panel, and a back attachment panel, the central panel comprises a connection portion foldably connected to each of a front reinforcement portion and a back reinforcement portion, the blank comprising locking features comprising at least one male locking feature extending from a respective panel of the plurality of panels and at least one female locking feature at least partially defined in a respective panel of the plurality of panels;

arranging the plurality of panels to form a front portion of the carrier comprising the front attachment panel;

arranging the plurality of panels to form a back portion of the carrier comprising the back attachment panel;

arranging the plurality of panels to form a central portion of the carrier comprising the central panel and extending from the front portion of the carrier to the back portion of the carrier; and at least partially inserting the at least one male locking feature through the at least one female locking feature to maintain an erected configuration of the carrier.

49. The method of claim 48, wherein the front reinforcement portion is foldably connected to the front attachment panel and the back reinforcement portion is foldably connected to the back attachment panel.

50. The method of claim 49, wherein the front attachment panel comprises an attachment portion, an interior marginal portion foldably connected to the attachment portion, and an exterior marginal portion foldably connected to the attachment portion, the front reinforcement portion of the central panel is foldably connected to the interior marginal portion of the front attachment panel, and the method further comprises positioning the front reinforcement portion of the central panel in at least partial face-to-face contact with the interior marginal portion of the front attachment panel.

51. The method of claim 50, wherein the back attachment panel comprises an attachment portion, an interior marginal portion foldably connected to the attachment portion of the back attachment panel, and an exterior marginal portion foldably connected to the attachment portion of the back attachment panel, the back reinforcement portion of the central panel is foldably connected to the interior marginal portion of the back attachment panel, and the method further comprises positioning the back reinforcement portion of the central panel in at least partial face-to-face contact with the interior marginal portion of the back attachment panel.

52. A package, the package comprising:

a plurality of containers; and a carrier holding the plurality of containers, the carrier comprising:

a plurality of panels forming a front portion, a back portion, and a central portion extending from the front portion to the back portion, the front portion comprising a front attachment panel at least partially receiving a respective container of the plurality of containers and a front top panel overlapping the front attachment panel, the back portion comprising a back attachment panel at least partially receiving a respective container of the plurality of containers and a back top panel overlapping the back attachment panel, the central portion comprising a central panel; and locking features maintaining an erected configuration of the carrier, the locking features comprising at least one male locking feature extending from a respective panel of the plurality of panels and being at least partially received in a respective at least one female locking feature at least partially defined in a respective panel of the plurality of panels.

53. The package of claim 52, wherein the front top panel is in at least partial face-to-face contact with the front attachment panel and the back top panel is in at least partial face-to-face contact with the back attachment panel.

54. The package of claim 53, wherein the plurality of panels further comprises a front side panel foldably connected to each of the front attachment panel and the front top panel, and the plurality of panels further comprises a back side panel foldably connected to the each of the back attachment panel and the back top panel.

55. The package of claim 53, wherein the plurality of panels further comprises a locking panel foldably connected to the front top panel, the at least one male locking feature extending from the locking panel.

56. The package of claim 55, wherein the at least one female locking feature is at least partially defined in the central panel.

57. The package of claim 56, wherein the at least one male locking feature is at least one locking tab and the at least one female locking feature is at least one cut.

58. The package of claim 56, wherein the at least one female locking feature is a first female locking feature, and the locking features further comprise a second female locking feature at least partially defined in the back top panel, the second female locking feature aligned with the first female locking feature such that each of the first female locking feature and the second female locking feature at least partially receive the at least one male locking feature.

59. The package of claim 58, wherein the at least one male locking feature is a first male locking feature, the locking features further comprise a second male locking feature extending from the locking panel and a third female locking feature at least partially defined in the back top panel and at least partially receiving the second male locking feature.

60. The package of claim 56, wherein the at least one female locking feature is a first female locking feature, the locking features further comprise a second female locking feature at least partially defined in the central panel and spaced apart from the first female locking feature, the at least one male locking feature is a first male locking feature extending from the locking panel, and the locking features further comprise a second male locking feature extending from the locking panel and at least partially received in the second female locking feature.

61. The package of claim 60, wherein the locking features further comprise a third female locking feature at least partially defined in the front attachment panel, the third female locking feature aligned with the second female locking feature, each of the third female locking feature and the second female locking feature at least partially receiving the second male locking feature.

62. The package of claim 61, wherein the locking panel is a front locking panel and the plurality of panels further comprises a back locking panel foldably connected to the back top panel, the locking features further comprise a fourth female locking feature at least partially defined in the back locking panel and aligned with each of the third female locking feature and the second female locking feature such that each of the fourth female locking feature, the third female locking feature, and the second female locking feature at least partially receives the second male locking feature.

63. The package of claim 62, wherein the locking features further comprise a fifth female locking feature at least partially defined in the back locking panel, the fifth female locking feature aligned with the first female locking feature such that each of the first female locking feature and the fifth female locking feature at least partially receives the first male locking feature.

64. The package of claim 63, wherein the locking features further comprise a third male locking feature extending from the back top panel and a sixth female locking feature at least partially defined in the back attachment panel, the sixth female locking feature at least partially receiving the third male locking feature.

65. A package, the package comprising:

a plurality of containers; and a carrier holding the plurality of containers, the carrier comprising:

a plurality of panels forming a front portion, a back portion, and a central portion extending from the front portion to the back portion, the front portion comprising a front attachment panel at least partially receiving a respective container of the plurality of containers, the back portion comprising a back attachment panel at least partially receiving a respective container of the plurality of containers, the central portion comprising a central panel foldably connected to each of the front attachment panel and the back attachment panel, the central panel comprises a connection portion foldably connected to each of a front reinforcement portion and a back reinforcement portion; and locking features maintaining an erected configuration of the carrier, the locking features comprising at least one male locking feature extending from a respective panel of the plurality of panels and being at least partially received in a respective at least one female locking feature at least partially defined in a respective panel of the plurality of panels.

66. The package of claim 65, wherein the front reinforcement portion is foldably connected to the front attachment panel and the back reinforcement portion is foldably connected to the back attachment panel.

67. The package of claim 66, wherein the front attachment panel comprises an attachment portion, an interior marginal portion foldably connected to the attachment portion, and an exterior marginal portion foldably connected to the attachment portion, the front reinforcement portion of the central panel is foldably connected to and in at least partial face-to-face contact with the interior marginal portion of the front attachment panel.

68. The package of claim 67, wherein the back attachment panel comprises an attachment portion, an interior marginal portion foldably connected to the attachment portion of the back attachment panel, and an exterior marginal portion foldably connected to the attachment portion of the back attachment panel, the back reinforcement portion of the central panel is foldably connected to and in at least partial face-to-face contact with the interior marginal portion of the back attachment panel.

* * * * *